(12) United States Patent
Barcello (10) Patent No.: US 10,061,533 B1
(45) Date of Patent: *Aug. 28, 2018

(54) DATA PROTECTION TIERING

(71) Applicant: VCE Company, LLC, Richardson, TX (US)

(72) Inventor: Michael Barcello, Southbury, CT (US)

(73) Assignee: VCE IP HOLDING COMPANY LLC, Richardson, TX (US)

(*) Notice: Subject to any disclaimer, the term of this patent is extended or adjusted under 35 U.S.C. 154(b) by 29 days.

This patent is subject to a terminal disclaimer.

(21) Appl. No.: 15/243,633

(22) Filed: Aug. 22, 2016

Related U.S. Application Data (63) Continuation of application No. 14/574,124, filed on Dec. 17, 2014, now Pat. No. 9,448,894.

(51) Int. Cl.
*G06F 11/00* (2006.01)
*G06F 3/06* (2006.01)
*G06F 11/14* (2006.01)

(52) U.S. Cl.
CPC .......... *G06F 3/0647* (2013.01); *G06F 3/0604* (2013.01); *G06F 3/065* (2013.01); *G06F 3/067* (2013.01); *G06F 3/0619* (2013.01); *G06F 11/1469* (2013.01); *G06F 2201/84* (2013.01)

(58) Field of Classification Search
USPC ........................ 714/6.23, 6.2, 6.22
See application file for complete search history.

(56) References Cited

U.S. PATENT DOCUMENTS

| | | | |
|---|---|---|---|
| 8,429,307 B1* | 4/2013 | Faibish | G06F 3/0605 710/1 |
| 9,275,060 B1* | 3/2016 | Supekar | G06F 17/30082 |
| 2006/0004588 A1* | 1/2006 | Ananda | G06Q 10/00 705/67 |
| 2011/0252201 A1* | 10/2011 | Koren | G06F 11/1448 711/135 |
| 2014/0172783 A1* | 6/2014 | Suzuki | G06F 8/63 707/609 |

* cited by examiner

*Primary Examiner* — Sarai E Butler
(74) *Attorney, Agent, or Firm* — Womble Bond Dickinson (US) LLP (57) ABSTRACT

A method for data protection tiering is provided. The method includes sending information about a plurality of data protection tiering options that are applicable to one or more applications, which are implementable via a plurality of data protection products. The method includes receiving data protection tiering selection information identifying at least one from among the plurality of data protection tiering options and implementing each of the of data protection tiering options consistent with the selection. A system and computer readable medium are also included.

20 Claims, 5 Drawing Sheets

DATA PROTECTION TIERING

CROSS-REFERENCE TO RELATED APPLICATION

This application is a continuation of U.S. patent application Ser. No. 14/574,124, filed Dec. 17, 2014. The patent application identified above is incorporated herein by reference in its entirety to provide continuity of disclosure.

BACKGROUND

In an ideal world, every piece of computer data would have synchronous copies made off-site to protect against a site disaster, periodic snapshot copies made to protect against data corruption, local nightly full copies to allow for rapid individual file or server restores, daily, weekly and nightly backups retained indefinitely to allow restoration of any file or the entire system back to any selected checkpoint, etc. Practically speaking, delivering the highest levels of data protection for all data is cost prohibitive, and would consume time, resources, network bandwidth and efforts beyond what is reasonable and available. As a result, Information Technology (IT) Administrators are forced to make decisions by considering cost and risk trade-offs. One best practice is for an IT Administrator to classify business data, and then apply the most cost effective data protection methodology for each class of data. For example, word processing documents might get a nightly backup, whereas order entry transactions might be synchronously replicated to a disaster recovery site. Today, levels of data protection tend to be managed via "islands of products". For example, there is one product for basic backup and recovery, a different product for snapshots, a product for asynchronous replication, another product for synchronous replication, and so on.

SUMMARY

A method for data protection tiering is provided. The method includes sending information about a plurality of data protection tiering options that are applicable to one or more applications, which are implementable via a plurality of data protection products. The method includes receiving data protection tiering selection information, wherein the data protection tiering selection information is comprised of information identifying at least one data protection tiering option from among the plurality of data protection tiering options, and implementing each of the data protection tiering options identified in received data protection tiering selection information. A system and computer readable medium are also included.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Data protection tiering for applications and/or servers is arranged and coordinated by an orchestrator, in various embodiments as described herein. The orchestrator presents data tiering options to a user, who can then make selections without necessarily being aware of the underlying data protection products or details of the various policies. The orchestrator determines priorities and scheduling, based on the user selections, and configures policies accordingly. Configured policies are then implemented with the data protection products, which the orchestrator coordinates and schedules. Data protection status reports and disaster recovery documentation are also generated by the orchestrator. Data protection tiering, as managed by the orchestrator, can be applied to various instances or combinations of applications and/or servers, including virtual machines and virtual applications.

Figure 1:
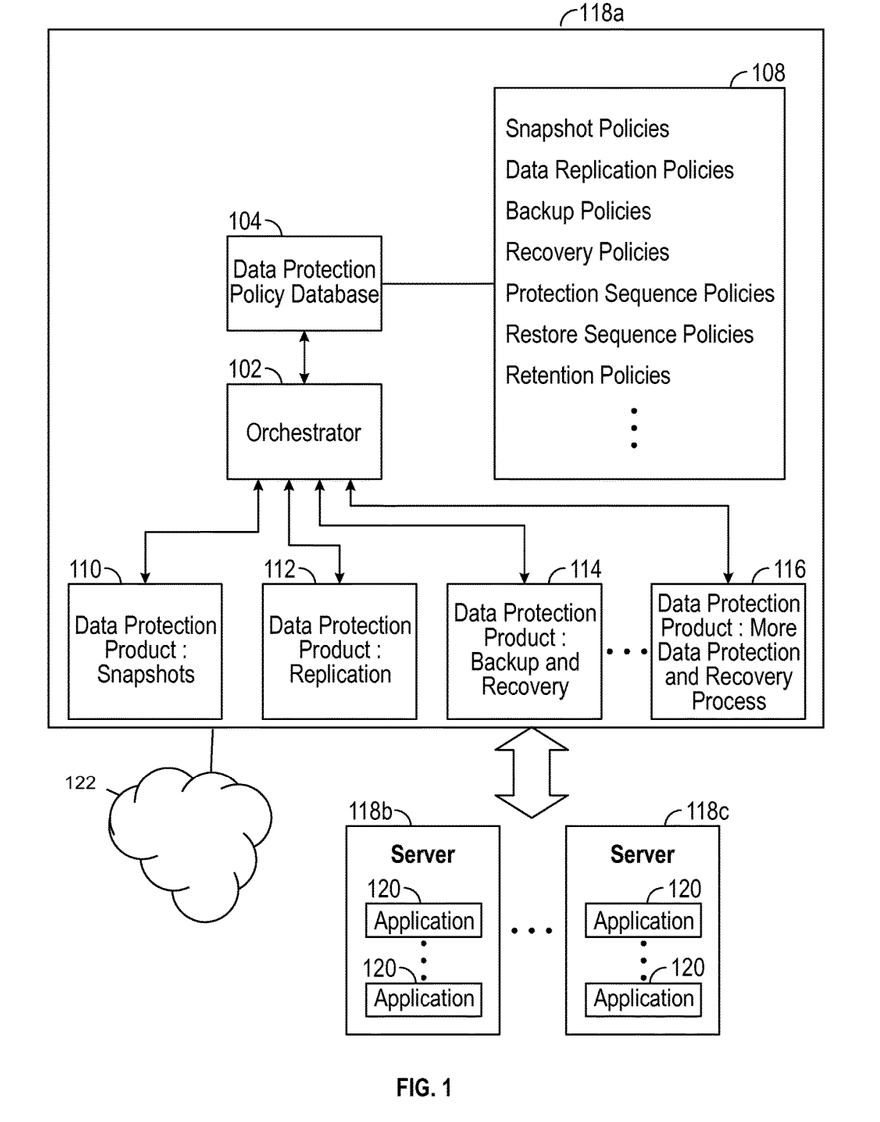
FIG. 1 is a system diagram depicting an orchestrator configuring policies and coordinating tiered data protection for applications and servers, based on user selections, in accordance with some embodiments.

FIG. 1 is a system diagram depicting an orchestrator 102 configuring policies 108 and coordinating tiered data protection for applications 120 and servers 118, based on user selections, in an embodiment of the present disclosure. Various data protection policies 108 are stored and accessible in a data protection policy database 104. Policies 108 could include snapshot policies, data replication policies, backup policies, recovery policies, protection sequence policies, restore sequence policies and retention policies, for example. Communication between the orchestrator 102 of server 118a and a user can take place over a network 122 such as an intranet or the global communication interface known as the Internet. Servers 118b and 118c are also configured to communicate through network 122. In cooperation with various data protection products 110, 112, 114, 116, the orchestrator 102 implements various policies 108, which in the orchestrator 102 configures based on user selection and input. Snapshots, replication, backup and recovery and other data protection and recovery processes are performed by the data protection products 110, 112, 114, 116 in accordance with the configured policies 108, as managed by the orchestrator 102. For example, data protection product 110 performs snapshots, data protection product 112 performs data replication, data protection product 114 performs backup and recovery, and one or more further data protection products 116 perform further data protection and recovery processes in some embodiments. A particular application 120 or server 118b, or combination of applications 120 and/or servers 118b and 118c could employ one, a subset, or all of the data protection products 110, 112, 114, 116 available in various scenarios, based on the user selection of data tiering. It should be appreciated that the orchestrator 102 can be hosted in a server 118a, which could be the same server or a differing server from the one or more servers 118b and 118c hosting applications 120. It should be further appreciated that the orchestrator 102 can be implemented in a cloud computing environment, e.g., using one or more physical servers or virtual machines.

Figure 2:
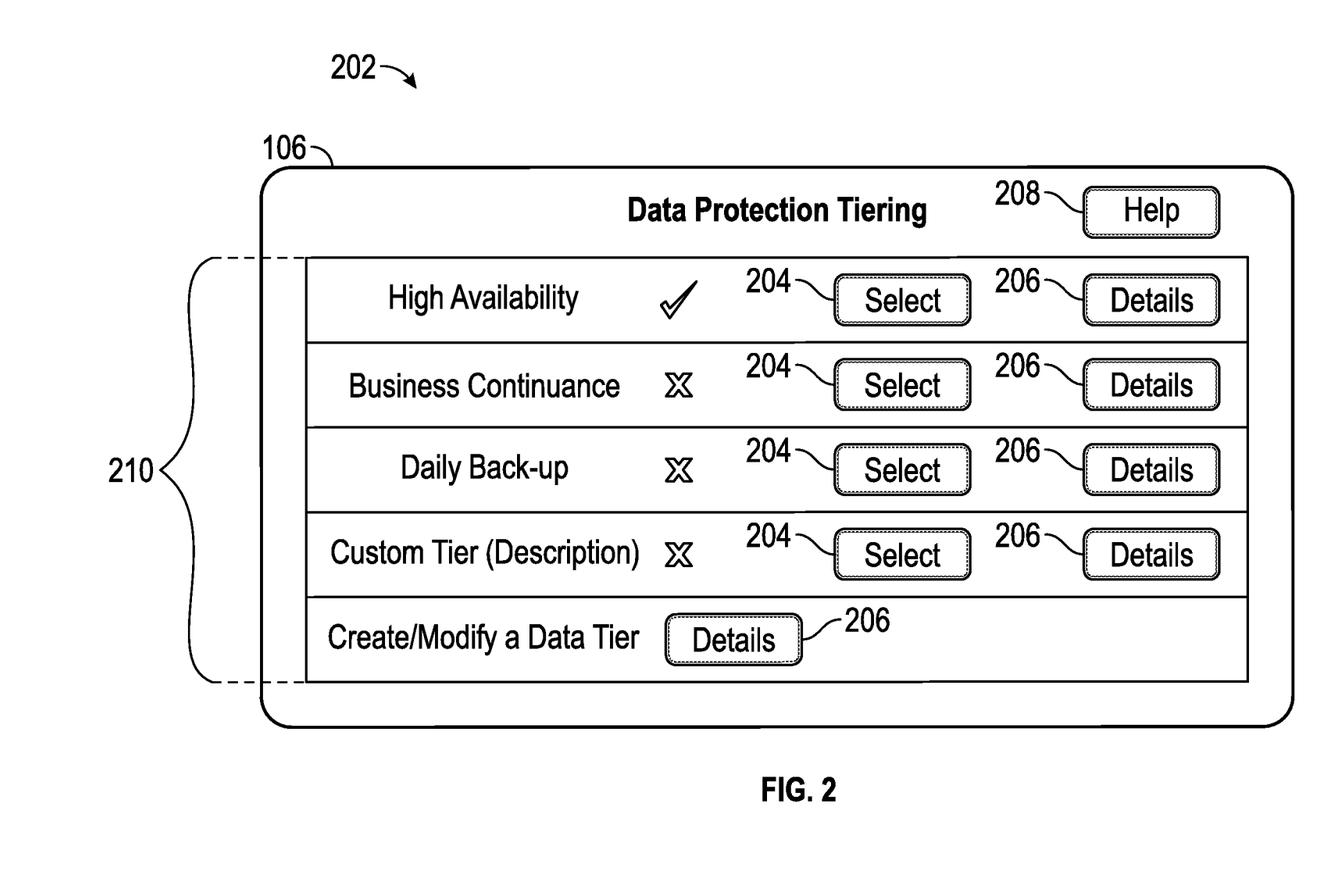
FIG. 2 is an example screenshot of a user interface offering data protection tiering options for user selection as input to the orchestrator of FIG. 1 in accordance with some embodiments.

FIG. 2 is an example screenshot 202 of a user interface offering data protection tiering options 210 for user selection as input to the orchestrator 102 of FIG. 1. For example, the orchestrator 102 of FIG. 1 could send an HTML (hypertext markup language) file to a user device that has a browser, and the user would then see information as shown in the example screenshot 202 or variation thereof. User interface 106 could be shown in response to a user assigning or configuring an application 120 and/or a server 118 or multiples thereof, or there could be a selection screen for selecting one or more applications 120 and/or servers 118. The data protection tiering options 210 could offer high-availability, business continuance, daily backup, one or more custom tiers, and the opportunity to create or modify a data tier. In some embodiments, the information shown in the example screenshot 202 conceals the identities of the underlying data protection products, relative to the user viewpoint, which frees the user from the need to know technical details, and supports seamless transitions to differing data protection products in a data center.

In the example screenshot 202 of FIG. 2, the user has the option of clicking on a select button 204, which selects the option or could activate a drop-down menu with further options. Clicking on details button 206 shows details of what the option 210 entails. For example, selecting high-availability as an option 210 could be interpreted by the orchestrator 102 as a request for frequent snapshots, as by data protection product 110 performing snapshots, or a particular level of backup and recovery as performed by data protection product 114 with those capabilities. Multiple levels of availability could be one of the options 210. Selecting business continuance as an option 210 could be interpreted by the orchestrator 102 as a request for synchronous replication on one tier, or asynchronous replication on another tier, as by a data protection product 112 that performs replication. Selecting a custom tier as an option 210, or selecting to create or modify a data tier as an option 210, could allow the user to specify protection priorities or sequences, or restore priorities or sequences, explicitly for multiple applications 120 or servers 118 in some embodiments. Alternatively, a priority value could be selected or a sequence placement could be selected for a particular server 118 or application 120 as an option 210, and the orchestrator 102 could then determine relative priorities or sequences among multiple applications 120 or servers 118. Data tiers could have various retention time spans in standard or custom tiers. Data tiers could include various recovery time objectives (RTO) and/or various recovery point objectives (RPO), retention periods, numbers of copies, recovery priorities in the event of disaster, archived levels and/or compliance levels, etc. Some of the data tiers could be specific to virtual computing environments, for example offering to snapshot entire machine states of a virtual machine or virtual application in some embodiments. Data tiers could offer differing levels of data protection for application data versus application software, and so on. One data tier could offer daily backups that are kept for two weeks and then deleted, while another tier offers daily backups that are kept for 30 days or monthly backups that are kept for one year, and so on. In some embodiments, one tier could offer to restore data in an hour, while another tier offers data restoration in four hours, or one day, or various other recovery time objectives. Further user interfaces and the contents thereof, including appearance, operation, options and tiers, are readily devised in accordance with the teachings herein.

Figure 3:
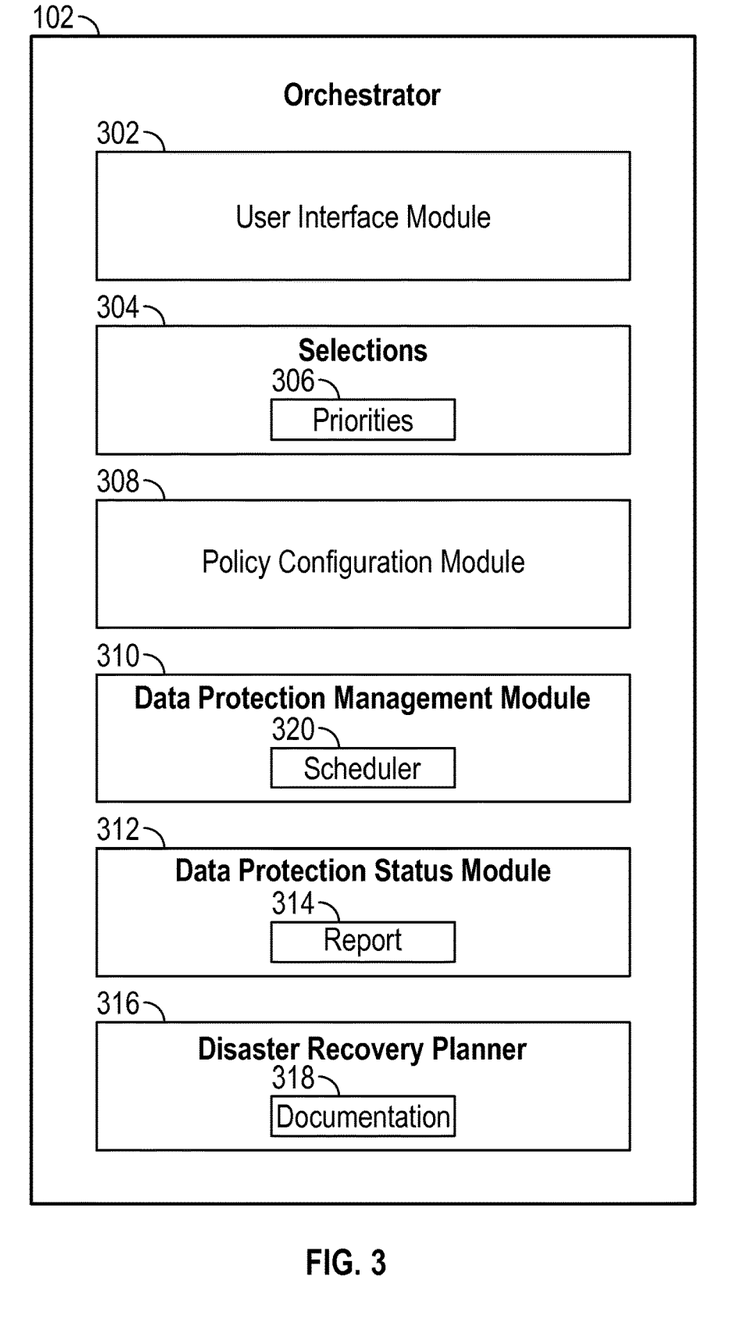
FIG. 3 is a block diagram of the orchestrator of FIG. 1 in accordance with some embodiments.

FIG. 3 is a block diagram of the orchestrator 102 of FIG. 1. The various modules 302, 304, 308, 310, 312, 314, 316, 318 depicted therein can be implemented as software executing on a processor, hardware, firmware, or various combinations thereof. In various embodiments, the orchestrator 102 has software code that interfaces to underlying backup replication and high-availability systems (i.e., the various data protection products 110, 112, 114, 116). A user interface module 302 generates an HTML file, or other suitable representation of the information to be sent to a user, such as discussed regarding FIGS. 1 and 2, and coordinates output to the user and input from the user (i.e., communication with the user). A selections module 304 tracks the user selections made via the user interface module 302, and determines priorities 306 either explicitly from user selections or implicitly based on aspects of the applications 120 or servers 118 for which the data protection tiering is being arranged. Policy configuration module 308 accesses the data protection policies 108 in the data protection policy database 104 (see FIG. 1). The policy configuration module 308 cooperates with the selections module 304 and configures the policies 108 according to the user selections and the determined priorities 306, and consistent with the data protection products 110, 112, 114, 116. For example, the policy configuration module 308 could configure a backup policy and a data retention policy with parameters such as backup frequency and data retention time according to the user selections of data protection tiering options 210.

Still referring to FIG. 3, data protection management module 310 applies the configured policies 108 to manage the data protection of the applications 120 and/or servers 118. A scheduler 320, included in the data protection management module 310, sets up schedules in accordance with the configured policies 108. For example, a backup policy and a recovery policy could be configured and applied to a data protection product 114 that performs backup and recovery, and the data protection management module 310 could schedule backups, and (if needed) arrange for recovery by directing the data protection product 114 to perform such services on the selected application 120 and/or server 118 or multiples thereof. Other types of data protection products are similarly scheduled and applied to various combinations of applications 120 and servers 118 by the data protection management module 310 in cooperation with the scheduler 320. A data protection status module 312 monitors data protection and the various data protection products 110, 112, 114, 116. This monitoring can be accomplished by communicating with the data protection products 110, 112, 114, 116, and polling them, querying them, or setting up a communication channel for receiving messages from them, etc. Status of data protection, for specified application(s) and/or server(s) 118a-c could be displayed via another HTML file sent by the user interface module 302, or indicated in a report produced by a report generator 314. Status updates could be automatic, triggered by events, periodic, or upon user request.

A disaster recovery planner module 316 generates plans for disaster recovery. Since the orchestrator 102 has awareness of which data protection products 112 are performing which services for which applications 120 and which servers 118, the disaster recovery planner module 316 can place related or relevant information in a disaster recovery plan. For example, if a data protection product 112 that performs replication is being managed by the data protection management module 310 to do data replication for a specified application 120, the disaster recovery planner module 316 plans for the rapid switchover to a replicated data set. If snapshots are being made by a data protection product 110 that performs snapshots, as managed by the data protection management module 310 for a specified server 118, the disaster recovery planner module 316 plans for a data restore from one of the snapshots. If data backups are being made by a data protection product 114 that performs backup and recovery, as managed by the data protection management module 310 for specified combination of servers 118 and applications 120, the disaster recovery planner plans for a data restore from backup storage that is used by the data protection product 114. Such planning can include restore sequences or priorities in accordance with the user selection. A further service performed by the disaster recovery planner module 316, in some embodiments, is calculating how long a data restore takes, based on restore speeds and the amount of data to be restored. A documentation module 318 in the disaster recovery planner module 316 generates disaster recovery documentation, which could be in the form of a file in various formats, and could include various combinations of the above information. Generating the disaster recovery documentation could be done automatically in response to the user selections, or upon user request.

As an example, the disaster recovery documentation could specify which data protection product 110, 112, 114, 116 performs which actions in which sequence, the location of backup data, which application 120 or server 118 is receiving the restored data, and how quickly the restore can be performed. In some cases, the disaster recovery documentation specifies sequence or priority for restoring multiple applications 120 and/or multiple servers 118. One example disaster recovery scenario would be to bring a server back online, then bring an application back online, and finally restore the data for the application. This could be specified in a disaster recovery plan document. As a further embodiment, the disaster recovery planner module 316 could analyze a particular disaster recovery plan and make recommendations for use of various data protection products 110, 112, 114, 116 to improve recovery time or improve data protection, and output such advice in the disaster recovery documentation produced by the documentation module 318.

In some embodiments, the disaster recovery planner module 316 produces a disaster recovery plan which the data protection management module 310 can act upon, in cooperation with the data protection products 110, 112, 114, 116. This mechanism could be shown and supported in an HTML file sent by the user interface module 302 (see FIGS. 1, 2 and 3) as an option for single button disaster recovery execution. For example, a user could press a "red button" as seen in a webpage based on the HTML file sent by the user interface module 302 (or in another user interface screen) for disaster recovery, and the data protection management module 310 would then perform actions based on the disaster recovery plan, coordinating data sources, data destinations and appropriate data protection products 110, 112, 114, 116. An entire site could be recovered by bringing servers back online in sequence, configuring a network (e.g., a software defined network or SDN), then bringing applications and data back online, all as specified in a disaster recovery plan consistent with user selected options.

Figure 4:
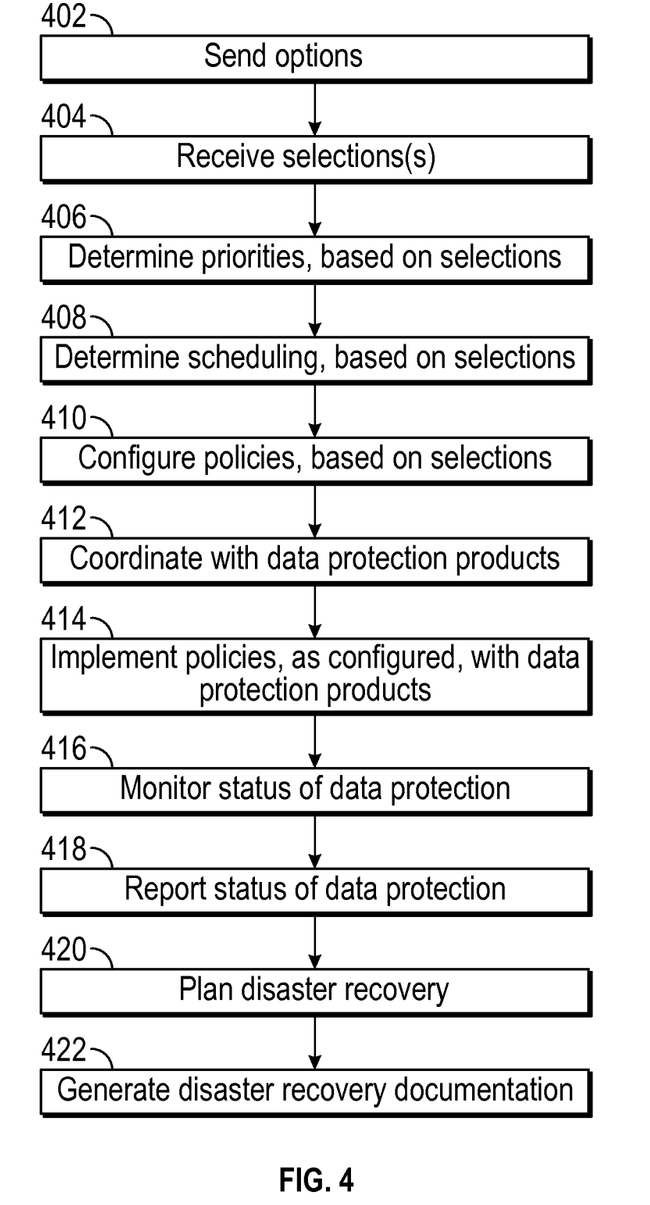
FIG. 4 is a flow diagram of a method of data tiering, which can be practiced on or by the orchestrator of FIGS. 1 and 3, in accordance with some embodiments.

FIG. 4 is a flow diagram of a method of data tiering, which can be practiced on or by the orchestrator of FIGS. 1 and 3, using input via a user interface such as shown in FIG. 2. The method can be practiced by a processor, such as in a server or other computing device. In an action 402, options are transmitted from a server for presentation to a user. For example, as indicated in the screenshot of FIG. 2, a user is presented the ability to select one or more application(s) or server(s) to be protected, and data protection tiering options that are applicable to these selections and which represent data protection policies that are implementable via data protection products. This information could be presented to the user in various formats, for user selection of one or more options. In an action 404, one or more selections are received by the server. For example, the user could click on one or more of the options, or enter information (e.g., a parameter value) that is interpreted as selecting an option. Priorities are determined, based on the selections, in an action 406. Scheduling is determined, based on the selections, in an action 408. Priorities and/or scheduling could be entered explicitly by the user, or could be determined based on a selection of one or more of the data tiering options in some embodiments.

Policies are configured, based on the selections, in an action 410 of FIG. 4. For example, the policies could be from a data protection policy database, and could be configured with various parameters and in accordance with the user selections and the data protection products available in the system. The orchestrator, processor or other system performing the actions of the method coordinates with the data protection products, in an action 412. The coordination with the data protection products could include coupling to and communicating via various interfaces of the data protection products. The policies, as configured in the action 410, are implemented with the data protection products, in an action 414. Status of data protection is monitored, in an action 416. Status of data protection is reported, in an action 418. In some embodiments, the report could be in the form of a message or a file produced by the system. Disaster recovery is planned, in an action 420. Disaster recovery documentation is generated, in an action 422. For example, the disaster recovery plan, and documentation, could indicate location of data, restore sequence or priority, and which of various data protection products are involved in the disaster recovery. The disaster recovery plan and documentation could also indicate a recovery time (i.e., how long disaster recovery takes), or make recommendations.

Figure 5:
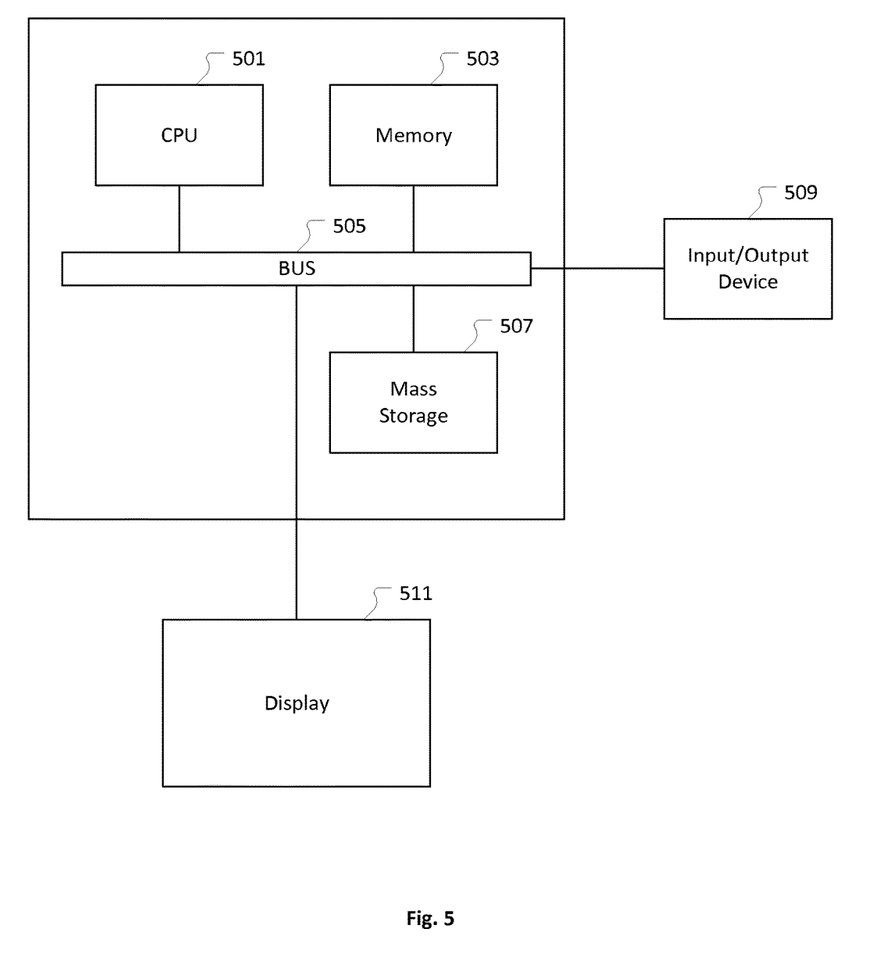
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for data protection tiering in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, or other known operating systems. It should be appreciated that the embodiments described herein may be integrated with virtualized computing system also.

The embodiments described above may include functionality that verifies capacity and performance of underlying data protection components prior to adding any additional back-ups or workload. In some embodiments, an additional workload may be added upon determining that the capacity and performance will not be pushed past some predetermined threshold taking into consideration the impact of the additional workload on the capacity and performance. A visual or audible alert or message may be generated either confirming the capacity and performance will not be pushed past the predetermined threshold or warning that the capacity and performance will be pushed past the predetermined threshold with the additional workload. In some embodiments, the mechanism described herein may be integrated with a storage capacity analysis system, such as the system described in U.S. application Ser. No. 14/557,045.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. In one embodiment, the system and functionality described above is integrated or included within a converged infrastructure environment, such as supported by a Vblock® or other converged infrastructure environment. The integration of the system and functionality may be a partial or complete integration in various embodiments.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. As noted above with reference to FIG. 1, all or some of the components of the system may be implemented in a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for data protection tiering, comprising:
   sending information about a plurality of data protection tiering options that are applicable to one or more applications and that represent a plurality of data protection policies which are implementable via a plurality of data protection products;
   receiving data protection tiering selection information, wherein the data protection tiering selection information is comprised of information identifying at least one data protection tiering option from among the plurality of data protection tiering options; and
   implementing each of the data protection tiering options identified in the received data protection tiering selection information, wherein at least one action of the method is performed by a processor.

2. The method for data protection tiering of claim 1, wherein the sending, receiving and implementing are performed in a cloud computing environment.

3. The method for data protection tiering of claim 1, further comprising:
   accessing a plurality of data protection policies in a data store; and
   configuring the at least one of the plurality of data protection policies consistent with the data protection tiering selection information and consistent with at least one of the plurality of data protection products.

4. The method for data protection tiering of claim 1, further comprising:
   generating disaster recovery information, based on the data protection tiering selection information and the one or more applications, wherein the disaster recovery information comprises information identifying a sequence or process for restoring data to the one or more applications via the plurality of data protection products.

5. The method for data protection tiering of claim 1, wherein the plurality of data protection tiering options includes at least one of:
   a first option associated with one of the plurality of data protection products that creates snapshots;
   a second option associated with one of the plurality of data protection products that performs replication;
   a third option associated with one of the plurality of data protection products that performs backup and recovery;
   a fourth option directed to a data retention period;
   a fifth option directed to a backup schedule;
   a sixth option directed to a priority for data protection of the one or more applications;
   a seventh option specifying a protection sequence, relative to a plurality of servers; or
   an eighth option specifying a restore sequence, relative to the plurality of servers.

6. The method for data protection tiering of claim 1, further comprising:
   generating information indicating a status of data protection of the one or more applications as implemented with the plurality of data protection products.

7. The method for data protection tiering of claim 1, wherein implementing at least one of the plurality of data protection policies comprises:
   establishing a priority of each of a plurality of applications, consistent with the data protection tiering selection information; and
   scheduling a plurality of backup or restore processes with the plurality of data protection products in accordance with the priority of each of the plurality of applications.

8. A tangible, non-transitory, computer-readable media having instructions thereupon which, when executed by a processor, cause the processor to perform a method comprising:

sending information about a plurality of data protection tiering options that are applicable to one or more applications and that represent a plurality of data protection policies which are implementable via a plurality of data protection products;

receiving data protection tiering selection information, wherein the data protection tiering selection information is comprised of information identifying at least one data protection tiering option from among the plurality of data protection tiering options; and implementing each of the data protection tiering options identified in the received data protection tiering selection information.

9. The computer-readable media of claim 8, wherein the method further comprises:

accessing a plurality of data protection policies in a data store; and configuring the at least one of the plurality of data protection policies consistent with the data protection tiering selection information and consistent with at least one of the plurality of data protection products.

10. The computer-readable media of claim 8, wherein the method further comprises:

generating disaster recovery information, based on the data protection tiering selection information and the one or more applications, wherein the disaster recovery information comprises information identifying a sequence or process for restoring data to the one or more applications via the plurality of data protection products.

11. The computer-readable media of claim 8, wherein the plurality of data protection tiering options includes at least one of:

a first option associated with one of the plurality of data protection products that creates snapshots;

a second option associated with one of the plurality of data protection products that performs replication;

a third option associated with one of the plurality of data protection products that performs backup and recovery;

a fourth option directed to a data retention period;

a fifth option directed to a backup schedule;

a sixth option directed to a priority for data protection of the one or more applications;

a seventh option specifying a protection sequence, relative to a plurality of servers; or an eighth option specifying a restore sequence, relative to the plurality of servers.

12. The computer-readable media of claim 8, wherein the method further comprises:

generating information indicating a status of data protection of the one or more applications as implemented with the plurality of data protection products.

13. The computer-readable media of claim 8, wherein to implementing at least one of the plurality of data protection policies comprises:

establishing a priority of each of a plurality of applications, consistent with the data protection tiering selection information; and scheduling a plurality of backup or restore processes with the plurality of data protection products in accordance with the priority of each of the plurality of applications.

14. A data protection tiering system, comprising an orchestrator having at least one processor configured to perform actions comprising:

sending information about a plurality of data protection tiering options that are applicable to one or more applications and that represent a plurality of data protection policies which are implementable via a plurality of data protection products;

receiving data protection tiering selection information, wherein the data protection tiering selection information is comprised of information identifying at least one data protection tiering option from among the plurality of data protection tiering options; and implementing each of the data protection tiering options identified in the received data protection tiering selection information.

15. The data protection tiering system of claim 14, wherein the sending, receiving and implementing take place in a cloud computing environment, and wherein the orchestrator is implemented in the cloud computing environment.

16. The data protection tiering system of claim 14, wherein the actions further comprise:

accessing a plurality of data protection policies in a data store; and configuring the at least one of the plurality of data protection policies consistent with the data protection tiering selection information and consistent with at least one of the plurality of data protection products.

17. The data protection tiering system of claim 14, wherein the actions further comprise:

generating disaster recovery information, based on the data protection tiering selection information and the one or more applications, wherein the disaster recovery information comprises information identifying a sequence or process for restoring data to the one or more applications via the plurality of data protection products.

18. The data protection tiering system of claim 14, wherein the plurality of data protection tiering options include at least one of:

a first option associated with one of the plurality of data protection products that creates snapshots;

a second option associated with one of the plurality of data protection products that performs replication;

a third option associated with one of the plurality of data protection products that performs backup and recovery;

a fourth option directed to a data retention period;

a fifth option directed to a backup schedule;

a sixth option directed to a priority for data protection of the one or more applications;

a seventh option specifying a protection sequence, relative to a plurality of servers; or an eighth option specifying a restore sequence, relative to the plurality of servers.

19. The data protection tiering system of claim 14, wherein the actions further comprise:

generating information indicating a status of data protection of the one or more applications as implemented with the plurality of data protection products.

20. The data protection tiering system of claim 14, wherein implementing at least one of the plurality of data protection policies comprises:

establishing a priority of each of a plurality of applications, consistent with the data protection tiering selection information; and scheduling a plurality of backup or restore processes with the plurality of data protection products in accordance with the priority of each of the plurality of applications.

* * * * *